C. J. MILBRADT.
SLICER AND GRATER.
APPLICATION FILED APR. 9, 1921.
1,414,297.
Patented Apr. 25, 1922.
2 SHEETS—SHEET 1.
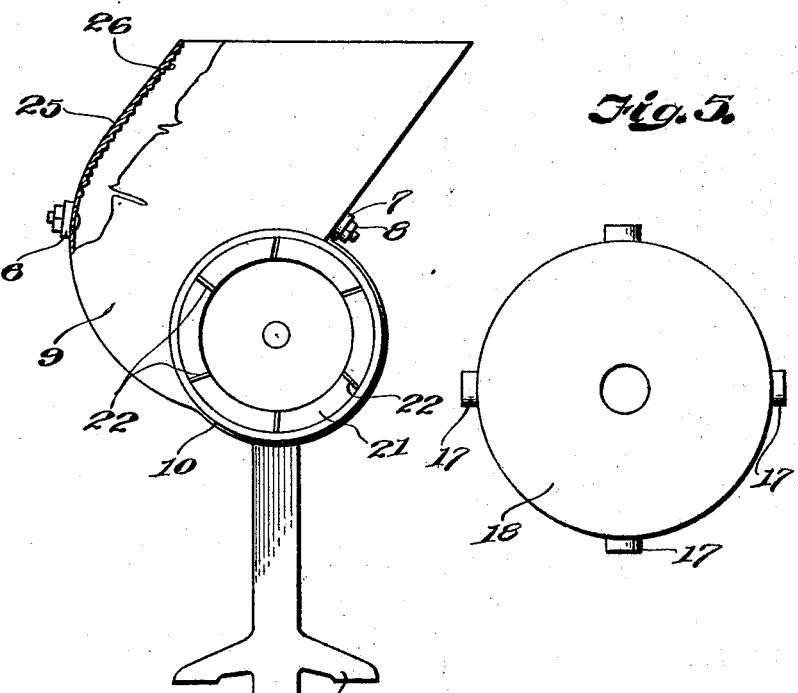
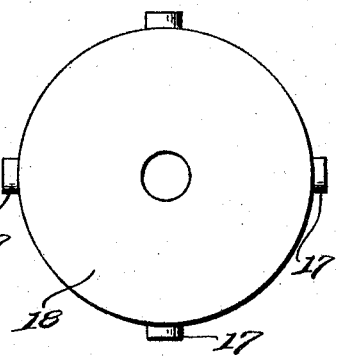
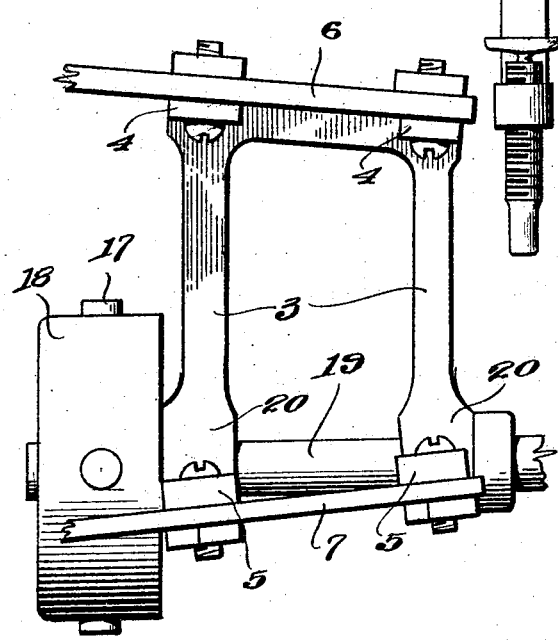
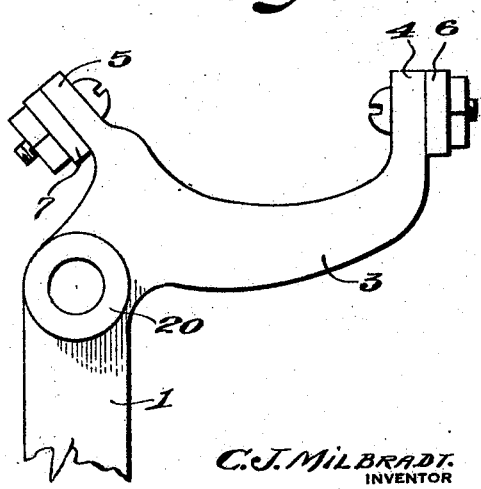
C. J. MILBRADT.
INVENTOR
BY Victor J. Evans.
ATTORNEY C. J. MILBRADT.
SLICER AND GRATER.
APPLICATION FILED APR. 9, 1921.
1,414,297.
Patented Apr. 25, 1922.
2 SHEETS—SHEET 2.
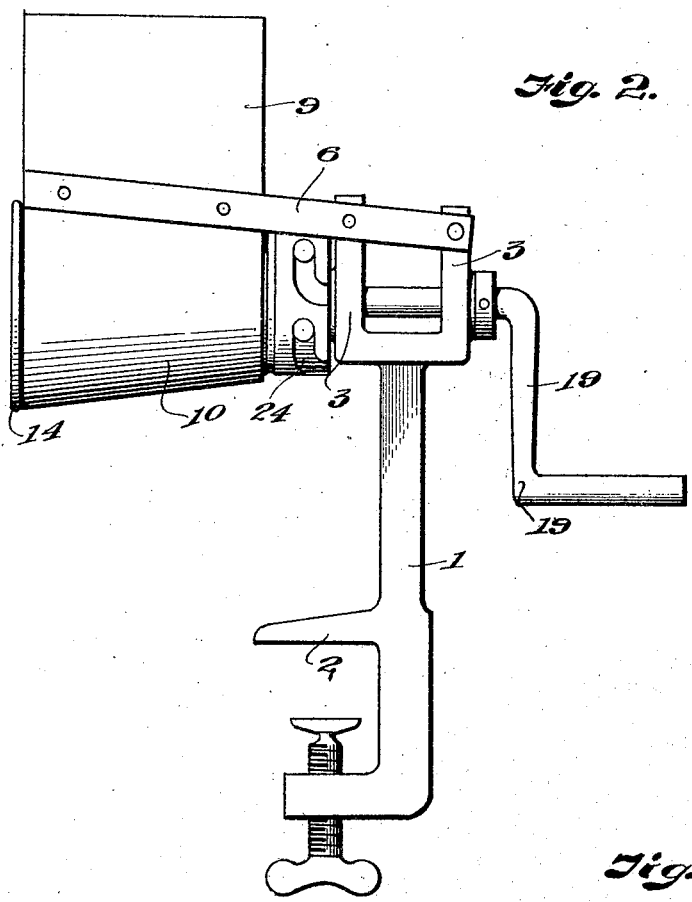
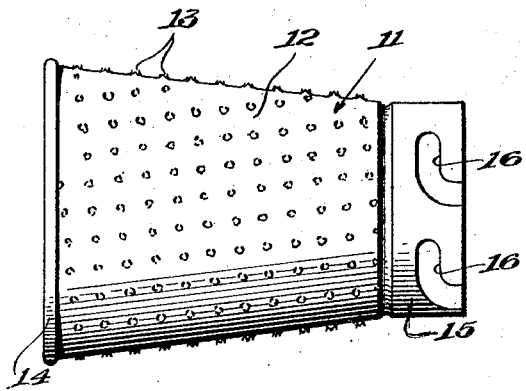
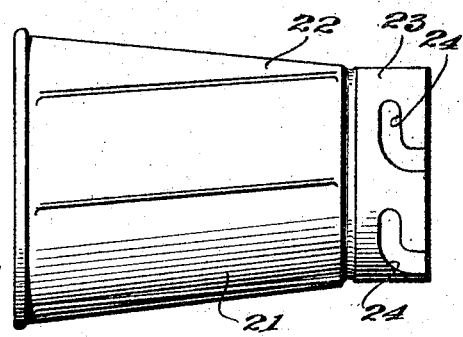
C. J. Milbradt
INVENTOR
BY Victor J. Evans
ATTORNEY

UNITED STATES PATENT OFFICE.

CLARENCE J. MILBRADT, OF CHICAGO, ILLINOIS.

SLICER AND GRATER.

1,414,297.  Specification of Letters Patent.  Patented Apr. 25, 1922.

Application filed April 9, 1921. Serial No. 459,854.

*To all whom it may concern:*

Be it known that I, CLARENCE J. MILBRADT, a citizen of the United States, residing at Chicago, in the county of Cook and State of Illinois, have invented new and useful Improvements in Slicers and Graters, of which the following is a specification.

This invention relates to a slicer and grater for slicing or grating various edibles, such as potatoes, apples, cocoanuts or the like and an object of the invention is to provide a grater or slicer which will permit the complete grating or slicing of the entire article being grated and will prevent the liability of grating the fingers during grating operation, as frequently occurs with the usual type of graters where reciprocatory movement thereover is maintained by the hand of the operator for the purpose of grating edibles and also to provide a device with interchangeable cutters whereby it may be used either for slicing or grating purposes.

A further object of the invention is to provide means in a retaining food hopper for preventing the article being grated or sliced from rotating during grating or slicing operation.

Another object of this invention is to provide a device as specified wherein the cutters are removable and which enbodies novel structure whereby the interchangeable cutters may be easily and quickly connected to the operating handle.

Other objects of the invention will appear in the following detailed description and in the accompanying drawing wherein:

Fig. 1 is an end elevation of the improved grater and slicer.

Fig. 2 is a side elevation of the improved grater and slicer.

Fig. 3 is a fragmentary top plan of the improved grater and slicer showing a part of the supporting mechanism therefor.

Fig. 4 is a detail side elevation of the support illustrated in Fig. 3.

Fig. 5 is a detail elevation of a part of the mechanism for connecting the cutters to the operating handle.

Fig. 6 is a side elevation of one form of cutter.

Fig. 7 is a side elevation of another form of cutter.

Referring more particularly to the drawing the improved cutter and slicer comprises a supporting structure 1 which has a table clamp structure 2 of any approved type, carried by its lower end to permit the clamping of the cutter or slicer to a support such as a table or the like. The upper end of the support 1 is provided with a pair of spaced substantially U shaped arms 3, each of which is provided with a substantially vertical attaching portion 4 and a second attaching portion 5 spaced therefrom and positioned at an acute angle to the horizontal. Hopper supporting bars 6 and 7 are connected to the pairs of attaching portions 4 and 5 respectively as clearly shown in Fig. 3 of the drawing, and they are also attached in any suitable manner as shown at 8 to the hopper 9. The hopper 9 is constructed of sheet metal or any analogous material and is provided with a substantially conical portion 10 extending transversely of the lower end of the hopper and having its base openings outwardly. The hopper proper has communication with the substantially conical portion 10 so that any article placed within the hopper will be engaged by the cutter which fits within the substantially conical portion 10.

Two forms of the cutters are shown in Figs. 6 and 7 of the drawings, one of which, namely, the cutter 11 shown in the Fig. 6 of the drawing, is provided for grating edibles, such as cocoanut, chocolate, nuts or the like and it comprises a substantially frustro conical body 12 which is provided with a plurality of outstruck grating portions 13 formed in the usual manner and which has its base portion rolled as shown at 14 which rolled portion serves as a stop to limit the insertion of the cutter into the substantially frusto conical portion 10 of the hopper 9. A sleeve 15 is carried by the inner end of the cutter 11 and it is provided with a plurality of bayonet slots 16 which are adapted to receive circumferentially spaced lugs 17 formed upon the connecting member 18. The connecting member 18, which is substantially dislike, is removably mounted upon the inner end of the crank handle 19 which crank handle is rotatably supported by suitable bearings 20 formed on the spaced arms 3. The cutter 21, shown in Fig. 7 of the drawing is provided for slicing various edibles, such as apples, potatoes, celery or the like and is provided with a plurality of longitudinally extending outstruck ribs 22 which are sharpened to provide a slicing action upon the edibles during rotation of the cutter 21. The cutter 21 has a sleeve 23 formed thereon similar to the sleeve 15 which sleeve 23 is provided with bayonet slots 24 for receiving the pin or lugs 17. By providing the bayonet slots 16 or 24 and the lugs 17 it will be seen that either of the cutters 11 or 21 may be easily and quickly connected to the operating handle 19 for use in connection with the hopper 9 and when it is desired to disconnect them all that is necessary is to return the crank handle 19 in a reverse direction for a short distance and then move the cutter longitudinally through the base or enlarged end of the portion 10 of the hopper. The reverse movement is made to connect a cutter with the handle 19. The inner surface of the wall 25 of the hopper 9 is provided with serrations 26 which are adapted to engage the article to be either grated or sliced and hold it against rotary movement which might occur during rotation of the cutter.

It is, of course, to be understood that the invention may be constructed in various other manners and the parts associated in different relations and, therefore, I do not desire to be limited in any manner except as set forth in the claims hereunto appended.

Having thus described my invention what I claim is:

1. In a cutter and slicer, a support having a clamp on one end and a fork on its other end, a hopper, bars attached to said hopper and fork, a transversely extending substantially frusto-conical portion formed on said hopper and positioned at one side of the hopper, the sides of said hopper extending tangentially to the perimeter of said frusto-conical portion to feed material thereto at one side thereof and a cutter removably and rotatably mounted in said hopper.

2. In combination a cutter, an attaching support, a hopper supported thereby, and provided with a substantially frusto-conical portion, one end of said cutter rolled to provide a bead for limiting the insertion of the cutter into the hopper.

3. In combination a cutter, an attaching support, a hopper supported thereby, a transversely extending substantially frusto-conical portion to feed material thereinto at one side thereof, a cutter removably and rotatably mounted in said cutter rolled to form a bead for limit insertion of the cutter into the hopper, and means for rotating said cutter.

In testimony whereof I affix my signature.

CLARENCE J. MILBRADT.